United States Patent
Hallberg

(10) Patent No.: US 12,459,426 B2
(45) Date of Patent: Nov. 4, 2025

(54) WARNING SIGN ARRANGEMENT FOR A VEHICLE

(71) Applicant: VOLVO AUTONOMOUS SOLUTIONS AB, Gothenburg (SE)

(72) Inventor: Henrik Hallberg, Gothenburg (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 619 days.

(21) Appl. No.: 17/660,921

(22) Filed: Apr. 27, 2022

(65) Prior Publication Data

US 2022/0355729 A1 Nov. 10, 2022

(30) Foreign Application Priority Data

May 7, 2021 (EP) ................................. 21172719

(51) Int. Cl.
  *B60Q 1/52* (2006.01)
  *B60Q 1/50* (2006.01)
  *B60Q 7/02* (2006.01)
  *B60R 16/033* (2006.01)

(52) U.S. Cl.
  CPC .............. *B60Q 1/50* (2013.01); *B60R 16/033* (2013.01)

(58) Field of Classification Search
  CPC ................................. B60Q 1/50; B60R 16/033
  See application file for complete search history.

(56) References Cited

U.S. PATENT DOCUMENTS

| 3,255,725 | A | * | 6/1966 | Von Kreidner | .......... | B60Q 7/02 340/471 |
| 3,800,430 | A | * | 4/1974 | Samra | ..................... | B60R 13/00 362/540 |
| 4,054,789 | A | * | 10/1977 | Romanelli | ............... | B60Q 3/30 362/464 |
| 4,129,857 | A | * | 12/1978 | Espinosa | .................. | B60Q 7/00 40/490 |
| 4,192,090 | A | * | 3/1980 | Seth | ........................ | B60Q 7/00 340/472 |

(Continued)

FOREIGN PATENT DOCUMENTS

| CN | 201283828 Y | 8/2009 |
| CN | 110525331 A | 12/2019 |

(Continued)

OTHER PUBLICATIONS

European Search Report dated Oct. 7, 2021 in corresponding European Patent Application No. 21172719.3, 7 pages.

*Primary Examiner* — Quang Pham
(74) *Attorney, Agent, or Firm* — .Venable LLP; Jeffri A. Kaminski

(57) ABSTRACT

A warning sign arrangement for a vehicle, comprises a warning sign, a warning sign hiding device comprising an electric locking mechanism, the warning sign hiding device being configured to hide the warning sign when the electric locking mechanism is active, and to expose the warning sign when the electric locking mechanism is deactivated, The electric locking mechanism comprises a first electric lock configured to be powered by a main electric power supply of the vehicle, and a second electric lock configured to be powered by a backup electric power supply of the vehicle, wherein both of the first electric lock and the second electric lock must be deactivated to expose the warning sign.

12 Claims, 3 Drawing Sheets

(56) References Cited

U.S. PATENT DOCUMENTS

| | | | | |
|---|---|---|---|---|
| 4,456,126 A * | 6/1984 | Hicks, Jr. | | B60Q 7/00 |
| | | | | 362/253 |
| 4,787,163 A * | 11/1988 | Berg | | G09F 21/042 |
| | | | | 40/592 |
| 5,097,612 A * | 3/1992 | Williams | | E01F 9/662 |
| | | | | 40/550 |
| 5,566,485 A * | 10/1996 | Chang | | B60Q 1/52 |
| | | | | 340/472 |
| 5,764,141 A * | 6/1998 | Chang | | B60Q 1/302 |
| | | | | 340/475 |
| 5,949,151 A * | 9/1999 | Nakajima | | B60R 25/1004 |
| | | | | 340/426.3 |
| 5,970,639 A * | 10/1999 | Hui | | B60Q 7/00 |
| | | | | 40/610 |
| 6,275,149 B1 * | 8/2001 | Tung | | B60Q 7/00 |
| | | | | 340/471 |
| 6,799,877 B2 * | 10/2004 | Watkins | | B60Q 1/52 |
| | | | | 40/205 |
| 7,096,102 B1 * | 8/2006 | Parker, Sr. | | B60R 25/102 |
| | | | | 340/426.1 |
| 8,336,480 B2 * | 12/2012 | Li | | B60Q 7/00 |
| | | | | 116/28 R |
| 9,193,306 B2 * | 11/2015 | Espig | | B60R 9/055 |
| 9,840,193 B1 * | 12/2017 | Chea | | B60Q 3/68 |
| 10,102,782 B1 * | 10/2018 | Konshin | | G09F 13/0413 |
| 10,124,757 B1 * | 11/2018 | Kerr | | B60Q 7/00 |
| 11,065,979 B1 * | 7/2021 | Demont | | H02P 29/025 |
| 11,383,637 B2 * | 7/2022 | Ahn | | B60Q 1/52 |
| 11,506,741 B2 * | 11/2022 | Nam | | G11C 5/141 |
| 11,511,689 B2 * | 11/2022 | Rapp | | B60R 16/033 |
| 11,851,002 B2 * | 12/2023 | Lu | | G09F 21/04 |
| 2005/0018444 A1 * | 1/2005 | Todd | | B60Q 1/2615 |
| | | | | 362/540 |
| 2005/0156727 A1 * | 7/2005 | Golder | | B60Q 1/535 |
| | | | | 340/463 |
| 2006/0103543 A1 * | 5/2006 | Chen | | B60Q 7/00 |
| | | | | 340/815.45 |
| 2006/0127175 A1 * | 6/2006 | Tipaldo | | E01F 9/688 |
| | | | | 404/9 |
| 2008/0218321 A1 * | 9/2008 | Sakai | | G08B 29/181 |
| | | | | 340/425.5 |
| 2008/0234897 A1 * | 9/2008 | Tsuchida | | B62D 5/046 |
| | | | | 701/42 |
| 2009/0109023 A1 * | 4/2009 | Newman | | G08G 1/205 |
| | | | | 340/691.1 |
| 2012/0059516 A1 * | 3/2012 | Lundberg | | B25J 19/06 |
| | | | | 700/258 |
| 2012/0242466 A1 * | 9/2012 | Stillfried | | B60L 58/12 |
| | | | | 340/425.5 |
| 2013/0009770 A1 * | 1/2013 | Yeager | | G08B 29/04 |
| | | | | 340/506 |
| 2014/0145726 A1 * | 5/2014 | Chang | | G01R 31/52 |
| | | | | 324/503 |
| 2014/0214242 A1 * | 7/2014 | Seo | | B60L 58/20 |
| | | | | 701/2 |
| 2016/0340940 A1 * | 11/2016 | Krishnan | | G07C 9/00309 |
| 2017/0107747 A1 * | 4/2017 | Dente | | E05B 81/86 |
| 2017/0124788 A1 * | 5/2017 | Nishida | | G07C 5/0866 |
| 2018/0173237 A1 * | 6/2018 | Reiley | | B60Q 1/507 |
| 2019/0031094 A1 * | 1/2019 | Castillo Jaime | | B60Q 3/57 |
| 2019/0176729 A1 * | 6/2019 | Link | | B60L 58/22 |
| 2019/0275968 A1 * | 9/2019 | Kim | | B60L 1/10 |
| 2019/0389479 A1 * | 12/2019 | Kinoshita | | B60W 10/026 |
| 2019/0390641 A1 * | 12/2019 | Kinoshita | | B60K 6/485 |
| 2020/0017024 A1 * | 1/2020 | Mollo | | B60Q 1/46 |
| 2020/0023794 A1 * | 1/2020 | Maekawa | | H02J 7/0063 |
| 2020/0023888 A1 * | 1/2020 | Horitake | | H02J 7/34 |
| 2020/0062199 A1 * | 2/2020 | Kwon | | H02H 3/085 |
| 2020/0064831 A1 * | 2/2020 | Pedersen | | G01C 21/26 |
| 2020/0070753 A1 * | 3/2020 | Akuzawa | | B60R 16/033 |
| 2020/0070775 A1 * | 3/2020 | Linden | | B60R 16/033 |
| 2020/0313457 A1 * | 10/2020 | Kozuki | | H02J 7/0047 |
| 2020/0331385 A1 * | 10/2020 | Park | | B60R 11/00 |
| 2020/0408301 A1 * | 12/2020 | Scheiblecker | | F16H 63/3491 |
| 2021/0066938 A1 * | 3/2021 | Jeong | | H02J 7/34 |
| 2021/0237670 A1 * | 8/2021 | Takahara | | H02J 9/06 |
| 2021/0374816 A1 * | 12/2021 | Yamasaki | | G01R 31/392 |
| 2022/0001838 A1 * | 1/2022 | Yun | | B60L 58/12 |
| 2022/0029452 A1 * | 1/2022 | Kambara | | H02J 7/0047 |
| 2022/0219558 A1 * | 7/2022 | Vepari | | B60L 53/305 |
| 2022/0266777 A1 * | 8/2022 | Naizghi | | B60L 50/66 |

FOREIGN PATENT DOCUMENTS

| | | | | |
|---|---|---|---|---|
| CN | 112248930 A | * | 1/2021 | ............ B60Q 7/005 |
| DE | 102016014025 A1 | | 8/2017 | |
| KR | 20130090439 A | | 8/2013 | |
| KR | 20180098835 A | * | 9/2018 | ............ B60Q 7/00 |
| WO | 2021083484 A1 | | 5/2021 | |

* cited by examiner

WARNING SIGN ARRANGEMENT FOR A VEHICLE

TECHNICAL FIELD

The invention relates to a warning sign arrangement for a vehicle and to a vehicle.

The invention can be applied in heavy-duty vehicles, such as trucks and construction equipment. Although the invention will be described with respect to a heavy-duty truck, the invention is not restricted to this particular vehicle, but may also be used in other vehicles such as passenger cars, buses, etc. The invention is particularly applicable in autonomous vehicles intended to be autonomously operated in traffic, such as driverless trucks and construction equipment.

BACKGROUND

When a manually operated vehicle needs to perform a safe stop at the roadside, for example due to a malfunction of the vehicle or an accident, a driver of the vehicle places a warning sign in the form of a warning triangle at a distance behind the vehicle. Vehicles approaching from behind will be alerted by the warning sign and thus able to slow down and keep a safety distance to the stopped vehicle.

In autonomously operated vehicles, there may not be a human driver or operator present within the vehicle, or even a passenger. Nevertheless, if such an autonomous vehicle has to stop along the road due to a malfunction of the vehicle, vehicles approaching from behind need to be alerted for safety reasons. There is therefore a need to develop warning sign arrangements that can be exposed to surrounding traffic without relying on a human driver.

DE102016014025 discloses a warning sign that can be released from a vehicle in connection with an emergency stop. During normal operation of the vehicle, the warning sign is held under the vehicle by means of e.g. an electromagnet.

SUMMARY

A primary object of the invention is to provide an in at least some aspect improved warning sign arrangement for a vehicle, with a warning sign that is automatically exposed when necessary. In particular, it is an object to provide an in at least some aspect improved warning sign arrangement suitable for an automatically operated vehicle in which there is no human driver or operator present.

According to a first aspect of the invention, the warning sign arrangement comprises:
a warning sign,
a warning sign hiding device comprising an electric locking mechanism, the warning sign hiding device being configured to hide the warning sign when the electric locking mechanism is active, and to expose the warning sign when the electric locking mechanism is deactivated.

The electric locking mechanism comprises a first electric lock configured to be powered by a main electric power supply of the vehicle, and a second electric lock configured to be powered by a backup electric power supply of the vehicle, wherein both of the first electric lock and the second electric lock must be deactivated to expose the warning sign. The electric locking mechanism is active when powered, thus the first electric lock is active when powered by the main electric power supply and the second electric lock is active when powered by the backup electric power supply.

The electric locking mechanism enables automatic exposure of the warning sign by interruption of the electric power supply to the electric locking mechanism. The interrupted power supply will automatically lead to the deactivation of the electric locking mechanism. Since the electric locking mechanism further comprises two electric locks configured to be powered by different electric power supplies of the vehicle, and since both electric locks must be deactivated to expose the warning sign, accidental exposure of the warning sign is prevented. In a fully automated vehicle with electrified functions with high requirements on availability, for example steering and braking, a redundant electric power supply is needed in order to fulfil the functional safety requirements. Thus, the main electric power supply and the backup electric power supply should be independent of each other. If the main power supply is interrupted, the backup power supply is used to supply electric power to the above-mentioned functions. By powering the first electric lock by the main electric power supply and the second electric lock by the independent backup electric power supply, it is ensured that the warning triangle is not exposed unintentionally due to a single fault in one of the electric power supplies. By powering the electric locking mechanism using the main electric power supply and the backup electric power supply that are also used by the other functions of the vehicle, it is further ensured that an interruption in the electric power supplies, leading to a malfunction of e.g. a braking or a steering system, automatically also leads to the exposure of the warning sign.

The first electric lock may be configured to be deactivated automatically in response to an interruption of the main electric power supply, and the second electric lock may be configured to be deactivated automatically in response to an interruption of the backup electric power supply. In this way, it is ensured that the warning sign is automatically exposed in case of failure of both the main power supply and the backup power supply.

Optionally, the warning sign is configured to be exposed on a rear end surface of the vehicle. Thus, the warning sign will be clearly visible to vehicles approaching from behind. The warning sign arrangement should preferably be configured to expose the warning sign on the rear end surface of the vehicle without adding to a width of the vehicle, as measured in a transverse direction thereof. In this way, the warning sign will not protrude outside of the vehicle. This reduces the disturbance caused by the standing vehicle to the surrounding traffic.

Optionally, the electric locking mechanism is further configured to be deactivatable in response to receiving a deactivation signal. This enables exposing the warning sign when at least one of the main power supply and the backup power supply is still functional, by sending a deactivation signal. Such a signal may be sent to the electric locking mechanism as part of a safe stop strategy, for example if a malfunction that prevents the vehicle from travelling any further is detected. The signal may be received from a system or unit within the vehicle, or from a remotely located system, unit, or operator.

Optionally, the warning sign hiding device comprises a covering device configured to hide the warning sign when the electric locking mechanism is active. The covering device may hide a surface of the vehicle on which the warning sign is arranged, and/or the warning sign may be provided on a surface of the covering device, depending on the configuration of the covering device.

The covering device may for example be a rollable covering device or a foldable covering device. Depending on the configuration of the covering device, the warning sign hiding device may further comprise one or more spring members, wherein the electric locking mechanism is configured to hold the covering device against the force of the at least one spring member.

Optionally, the warning sign is provided at least partly on a surface of the covering device. It may e.g. be provided partly on a surface of the covering device, and partly on a surface of the vehicle, which surface is hidden by the covering device when the electric locking mechanism is active. The warning sign may in other embodiments be provided only on one or more surfaces of the covering device. Alternatively, the warning sign may be provided only on a vehicle surface hidden by the covering device when the electric locking mechanism is active.

Optionally, the covering device is a foldable covering device comprising at least two segments, a hinge mechanism being provided between each two adjacent segments so that the at least two segments are foldable onto one another. The covering device may be configured to expose the warning sign as it is unfolded, or as it is folded. By providing a plurality of foldable segments, the space required to fold/unfold the covering device is reduced, which reduces the risk of injury for a person located behind the vehicle as the warning sign is being exposed.

Optionally, the warning sign hiding device further comprises at least one spring member, the electric locking mechanism being configured to, when active, hold the covering device against the force of the at least one spring member. When the electric locking mechanism is deactivated, the at least one spring member exposes the warning sign by pulling on the covering device. This makes it possible to position the electric locking mechanism and the covering device more freely, without relying on gravity to expose the warning sign.

Optionally, the electric locking mechanism is provided vertically above or at a top level of the warning sign. Thus, upon deactivation of the two electric locks, gravity can be exploited to expose the warning sign, such as by unfolding the foldable covering device. In configurations relying on at least one spring member, the electric locking mechanism may, apart from being positioned above the warning sign, alternatively be provided below or beside the warning sign.

According to a second aspect of the invention, a vehicle comprising a warning sign arrangement according to the first aspect is provided. The vehicle may typically be an automated vehicle, such as a fully automated vehicle, for example a fully automated heavy-duty vehicle such as a truck, a bus or a working machine.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

The vehicle may be an electrical, hybrid, or plug-in hybrid vehicle comprising at least one electric motor, wherein an energy storage system provides power to the electric motor for providing propulsion for the vehicle. It is to be noted that the vehicle can therefore be either a partly or fully electric working machine. The vehicle may alternatively be powered by an internal combustion engine, in which case main and backup electric power supplies may be provided for powering and/or controlling of electric systems such as a steering system, a braking system, a lighting system, etc.

Optionally, the warning sign arrangement is arranged on a rear end of the vehicle, wherein the warning sign is configured to be exposed on a rear end surface of the vehicle. For example, the warning sign arrangement may be arranged on a back door or on a tail lift of a truck.

Optionally, the vehicle comprises a main electric power supply powering the first electric lock, and an independent backup electric power supply powering the second lock. The electric power supplies may e.g. be two independent electric energy storage systems of the vehicle.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

Figure 1A:
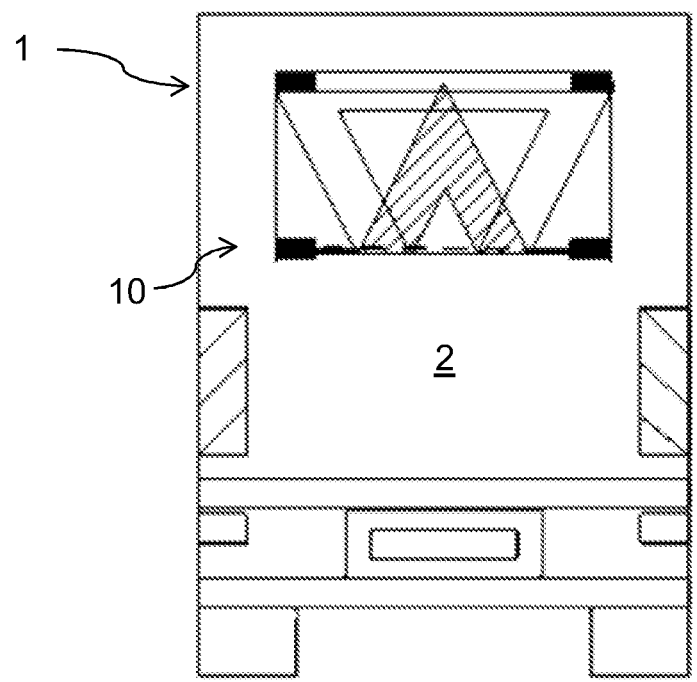
FIG. 1a is a schematic rear end view of a first vehicle.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1a shows a rear end view of a vehicle 1 in the form of a heavy-duty truck equipped with a tail lift (not illustrated), thus having a relatively large rear end surface 2 formed by the tail lift. A single warning sign arrangement 1 according to a first example embodiment of the invention is provided on the rear end surface 2, i.e. on a rear surface of the tail lift.

Figure 1B:
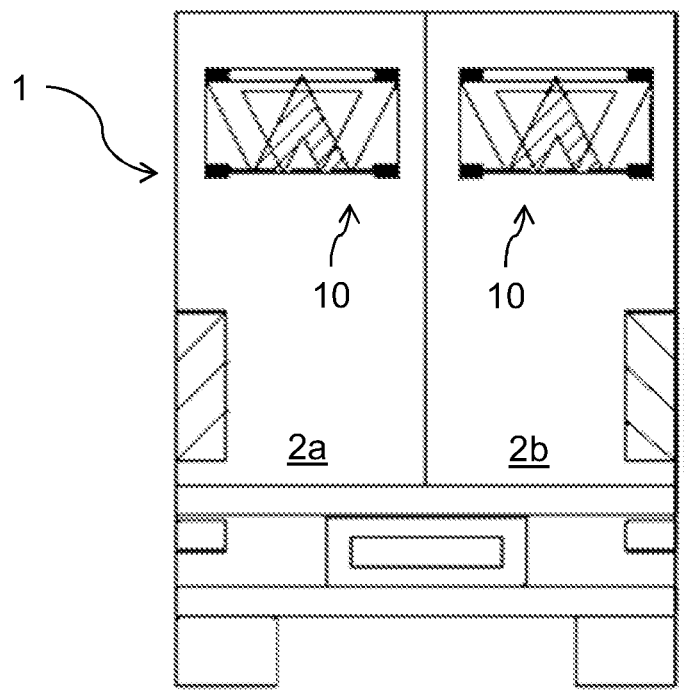
FIG. 1b is a schematic rear end view of a second vehicle.

FIG. 1b shows a rear end view of another vehicle 1 in the form of a heavy-duty truck equipped with double doors, each door comprising a rear end surface 2a, 2b of the vehicle 1. In this embodiment, two identical warning sign arrangements 10 according to the first embodiment are provided, one on each rear end surface 2a, 2b, respectively.

The vehicles 1 illustrated in FIGS. 1a-1b both comprise a main electric power supply and a backup electric power supply (not illustrated in FIGS. 1a and 1b), the backup electric power supply being independent from the main electric power supply. The main electric power supply and the backup electric power supply provide electric power to various systems and devices of the vehicle 1 requiring electric power for functionality. The main electric power supply and the backup electric power supply may be electric energy storage systems (ESS), each comprising one or more batteries.

Figure 2:
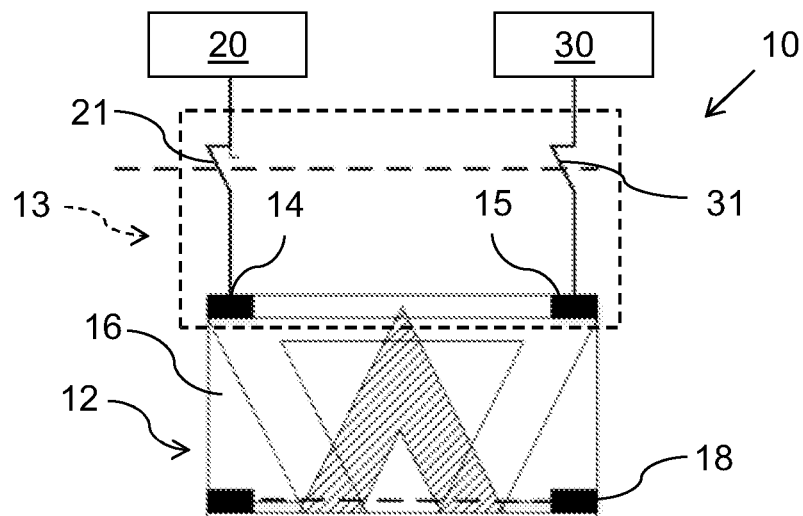
FIG. 2 schematically illustrates a warning sign arrangement according to a first example embodiment of the invention.
Figure 3:
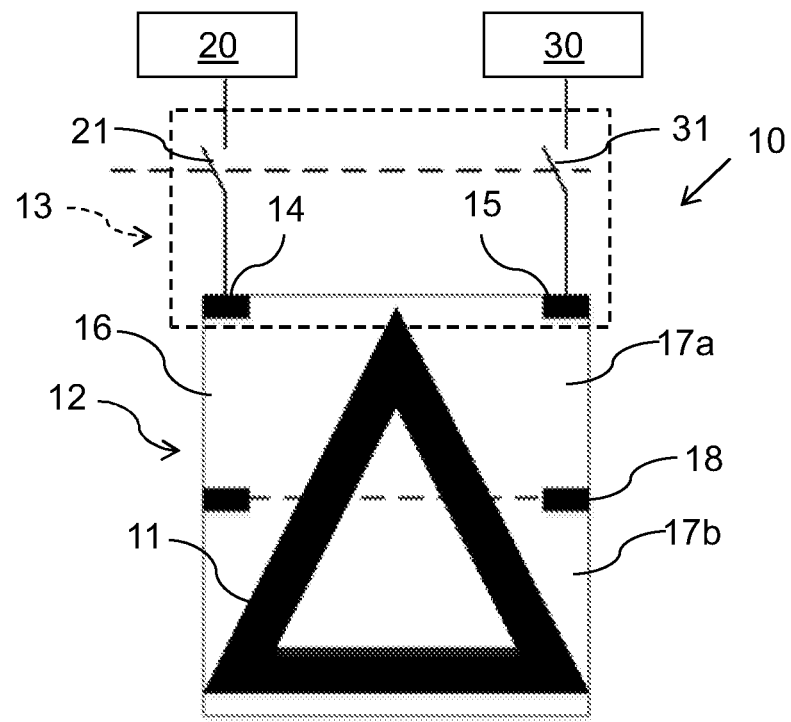
FIG. 3 is another view of the warning sign arrangement in FIG. 2, FIG. 4 schematically illustrates a warning sign arrangement according to a second example embodiment of the invention.

FIGS. 2 and 3 illustrate the warning sign arrangement 10 according to the first example embodiment in greater detail, wherein FIG. 2 shows the warning sign arrangement 10 in an unexposed state, i.e. with a warning sign hidden, and FIG. 3 shows the warning sign arrangement 10 in an exposed state, i.e. with a triangular warning sign 11 exposed. Apart from the warning sign 11, the warning sign arrangement 10 comprises a warning sign hiding device 12 comprising an electric locking mechanism 13. The electric locking mechanism 13 in turn comprises a first electric lock 14 configured to be powered by a main electric power supply 20 of the vehicle 1, and a second electric lock 15 configured to be powered by a backup electric power supply 30 of the vehicle 1, as described above. The warning sign hiding device 12 is configured to hide the warning sign 11 in the unexposed state, when the electric locking mechanism 13 is active as illustrated in FIG. 2. The warning sign hiding device 12 is further configured to expose the warning sign 11 in the exposed state, when the electric locking mechanism 13 is deactivated, as illustrated in FIG. 3. Both of the first electric lock 14 and the second electric lock 15 must be deactivated to expose the warning sign 11.

In the shown first example embodiment, the warning sign hiding device 12 comprises a foldable covering device 16 configured to hide the warning sign 11 when the electric locking mechanism 13 is active, i.e. when electric power is supplied to both electric locks 14, 15 from the main electric power supply 20 and from the backup electric power supply 30, respectively. The foldable covering device 16 comprises an upper segment 17a, a lower segment 17b, and a hinge mechanism 18 provided between the segments 17a, 17b, so that the two segments 17a, 17b are foldable onto one another. An upper part of the warning sign 11, dashed in FIG. 2, is provided on a surface of the upper segment 17a, while a lower part of the warning sign 11, shown with contours only in FIG. 2, is provided on a surface of the lower segment 17b. The electric locks 14, 15 are positioned vertically above the warning sign 11. When the electric locks 14, 15 are active, i.e. when electric power is supplied to the electric locks 14, 15, the lower segment 17b is folded onto the upper segment 17a so that the surfaces on which the warning sign 11 is provided are folded toward one another and the warning sign 11 is consequently hidden. Upon deactivation of the electric locks 14, 15, gravity causes the lower segment 17b to fall down and expose the warning sign 11.

In alternative embodiments (not shown), the upper segment 17a may be omitted, with the upper part of the warning sign 11 painted directly on the rear end surface 2 of the vehicle 1 and the lower part provided on a covering device hinged to the rear end surface 2 of the vehicle 1. As in the embodiment shown in FIGS. 2-3, the electric locking mechanism may be provided vertically above the covering device so that the covering device, when the electric locking mechanism is active, hides the upper part of the warning sign in the same way as illustrated in FIG. 2.

In yet other embodiments, more than two segments 17a, 17b may be provided, such as a plurality of vertically stackable segments foldable onto one another.

Figure 4:
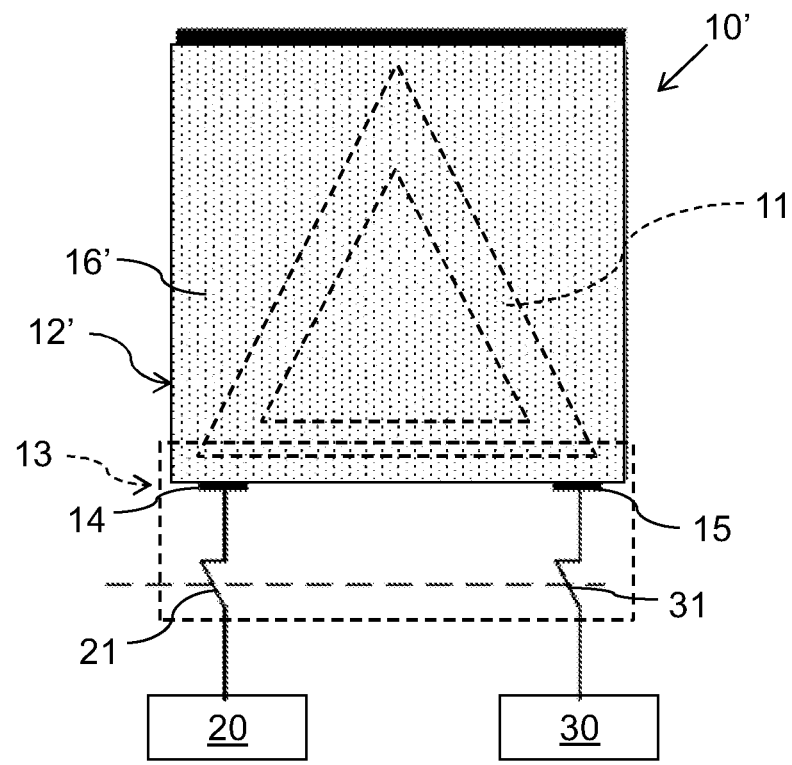
Figure 5:
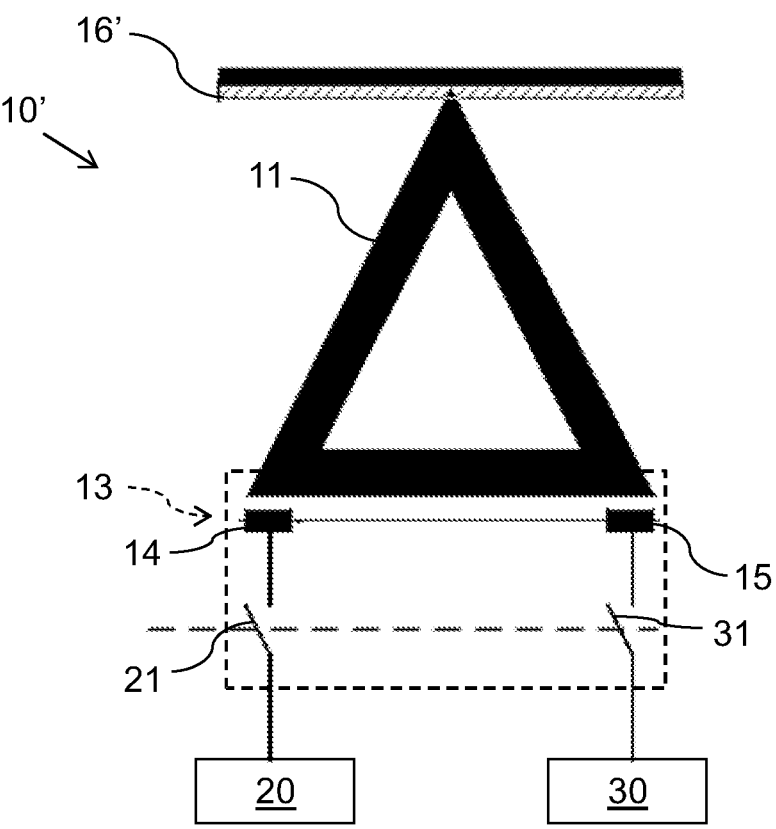
FIG. 5 is another view of the warning sign arrangement in FIG. 4.

A warning sign arrangement 10' according to a second example embodiment is shown in FIGS. 4-5. FIG. 4 shows the warning sign arrangement 10' in the unexposed state, with a warning sign 11 indicated using dashed lines, and FIG. 5 shows the warning sign arrangement 10' in the exposed state. In this example embodiment, the locking mechanism 13 comprising the first and second electric locks 14, 15 is provided vertically below a rollable covering device 16' and below the warning sign 11. A spring member (not shown) is arranged to roll up the rollable covering device 16', similar to a roller blind, upon deactivation of both the electric locks 14, 15, such as upon interruption of the power supply from the main electric power supply 20 and the backup electric power supply 30, respectively. Thus, the electric locks 14, 15 hold the rollable covering device 16' unrolled against the force of the spring member when active. When deactivated, the force of the spring member rolls up the covering device 16' and the warning sign 11 is exposed. In the exposed state, the covering device 16' is thus located above the warning sign 11. Alternatively, of course, the electric locking mechanism may be provided above the warning sign or beside the warning sign, with a roller of the rollable covering device located at the opposite side of the warning side with respect to the electric locking mechanism.

In both of the shown example embodiments, the first electric lock 14 is configured to be deactivated automatically in response to an interruption of the main electric power supply 20, and the second electric lock 15 is configured to be deactivated automatically in response to an interruption of the backup electric power supply 30. Such an interruption may be caused by a power-down of the vehicle 1.

The electric locking mechanism 13 may also be configured to be deactivatable in response to receiving a deactivation signal. In response to receiving the deactivation signal, switches 21, 31 are opened so as to interrupt the power supply to both of the electric locks 14, 15. The electric locking mechanism 13 may for this purpose comprise a control unit (not shown) provided with a communication interface for receiving signals via a hard-wired or wireless network. If only one of the main electric power supply 20 and the backup power supply 30 is functional, the electric locking mechanism 13 may upon receipt of the signal open the switch that turns off the power supply to the still active one of the two electric locks 14, 15, while the other electric lock has already been deactivated as a result of the malfunctioning power supply.

The first and the second electric locks 14, 15 may be any kind of locks that need electric power to be in a closed, active state, and that will transition to an open, deactivated state when no electric power is supplied to the electric lock. Such electric locks may be referred to as fail-safe electric locks, i.e. locks that are unlocked when de-energized. For example, the electric locks 14, 15 may be electromagnetic locks or fail-safe electric solenoid locks.

It is to be understood that the present invention is not limited to the embodiments described above and illustrated in the drawings; rather, the skilled person will recognize that many changes and modifications may be made within the scope of the appended claims.

The invention claimed is:

1. A warning sign arrangement for a vehicle, comprising:
   a warning sign,
   a warning sign hiding device comprising an electric locking mechanism, the warning sign hiding device being configured to hide the warning sign when the electric locking mechanism is active, and to expose the warning sign when the electric locking mechanism is deactivated,
   wherein the electric locking mechanism comprises a first electric lock configured to be powered by a main electric power supply of the vehicle, and a second electric lock configured to be powered by a backup electric power supply of the vehicle, the backup electric power supply being a redundant electric power supply of the vehicle configured to supply electric power to functions of the vehicle if the main electric power supply is no longer functional, wherein both of the first electric lock and the second electric lock must be deactivated to expose the warning sign, wherein the first electric lock is configured to be deactivated automatically in response to an interruption of the main electric power supply, and the second electric lock is configured to be deactivated automatically in response to an interruption of the backup electric power supply.

2. The warning sign arrangement according to claim 1, wherein the warning sign is configured to be exposed on a rear end surface of the vehicle.

3. The warning sign arrangement according to claim 1, wherein the electric locking mechanism is further configured to be deactivatable in response to receiving a deactivation signal.

4. The warning sign arrangement according to claim 1, wherein the warning sign hiding device comprises a covering device configured to hide the warning sign when the electric locking mechanism is active.

5. The warning sign arrangement according to claim 4, wherein the warning sign is provided at least partly on a surface of the covering device.

6. The warning sign arrangement according to claim 4, wherein the covering device is a foldable covering device.

7. The warning sign arrangement according to claim 6, wherein the covering device comprises at least two segments, a hinge mechanism being provided between each two adjacent segments so that the at least two segments are foldable onto one another.

8. The warning sign arrangement according to claim 4, wherein the covering device is a rollable covering device.

9. The warning sign arrangement according to claim 4, wherein the warning sign hiding device further comprises at least one spring member, the electric locking mechanism being configured to, when active, hold the covering device against the force of the at least one spring member.

10. The warning sign arrangement according to claim 1, wherein the electric locking mechanism is provided vertically above or at a top level of the warning sign.

11. A vehicle comprising: a warning sign arrangement comprising:
 a warning sign,
 a warning sign hiding device comprising an electric locking mechanism, the warning sign hiding device being configured to hide the warning sign when the electric locking mechanism is active, and to expose the warning sign when the electric locking mechanism is deactivated,
wherein
the electric locking mechanism comprises a first electric lock configured to be powered by a main electric power supply of the vehicle, and a second electric lock configured to be powered by a backup electric power supply of the vehicle, the backup electric power supply being a redundant electric power supply of the vehicle configured to supply electric power to functions of the vehicle if the main electric power supply is no longer functional, wherein both of the first electric lock and the second electric lock must be deactivated to expose the warning sign, wherein the first electric lock is configured to be deactivated automatically in response to an interruption of the main electric power supply, and the second electric lock is configured to be deactivated automatically in response to an interruption of the backup electric power supply.

12. The vehicle according to claim 11, wherein the warning sign arrangement is arranged on a rear end of the vehicle, and wherein the warning sign is configured to be exposed on a rear end surface of the vehicle.

* * * * *